W. A. PIKE.
DISPLAY BOX FOR WRITING PAPER.
APPLICATION FILED FEB. 2, 1912.

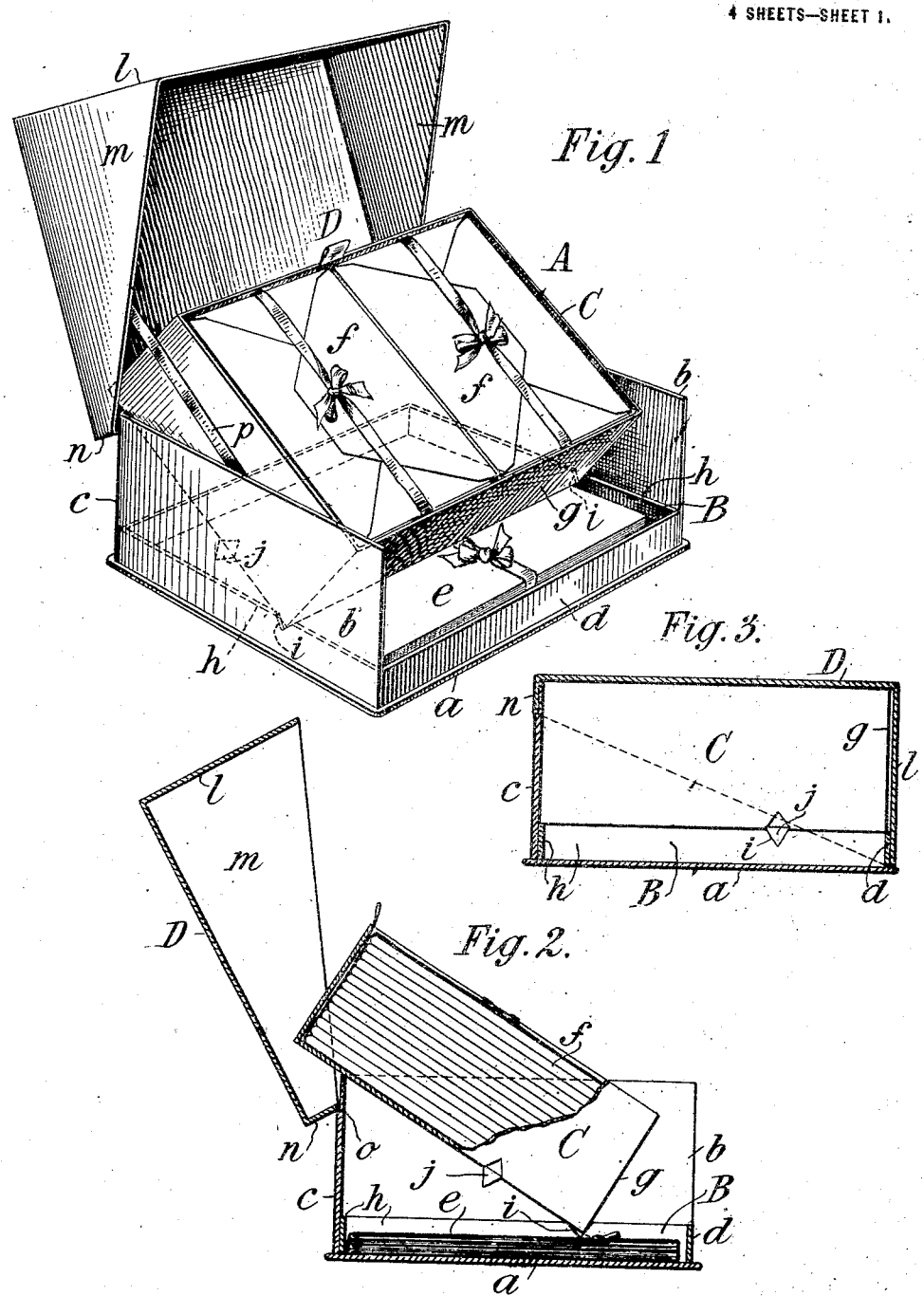

1,140,061.

Patented May 18, 1915.
4 SHEETS—SHEET 2.

WITNESSES:
René Bruine
J. D. Wallace

INVENTOR
William A. Pike
By Attorneys,
Fraser, Turk & Myers

W. A. PIKE.
DISPLAY BOX FOR WRITING PAPER.
APPLICATION FILED FEB. 2, 1912.

1,140,061.

Patented May 18, 1915.
4 SHEETS—SHEET 3.

WITNESSES:

INVENTOR:
William A. Pike
By Attorneys,

W. A. PIKE.
DISPLAY BOX FOR WRITING PAPER.
APPLICATION FILED FEB. 2, 1912.

1,140,061.

Patented May 18, 1915.
4 SHEETS—SHEET 4.

WITNESSES:
René Buine
L. L. Wallace

INVENTOR
William A. Pike
By Attorneys,
Fraser Turk & Myers

UNITED STATES PATENT OFFICE.

WILLIAM A. PIKE, OF PITTSFIELD, MASSACHUSETTS.

DISPLAY-BOX FOR WRITING-PAPER.

1,140,061.  Specification of Letters Patent.  Patented May 18, 1915.

Application filed February 2, 1912. Serial No. 674,937.

*To all whom it may concern:*

Be it known that I, WILLIAM A. PIKE, a citizen of the United States, residing in Pittsfield, in the county of Berkshire and State of Massachusetts, have invented certain new and useful Improvements in Display-Boxes for Writing-Paper, of which the following is a specification.

This invention relates to certain improvements in boxes for writing paper or the like which, while designed primarily to afford a convenient receptacle for the paper in use, are nevertheless especially adapted for displaying the paper to intending purchasers.

The principal object of the present invention is to provide a box of this character in which the paper and envelops are both exposed to view so that their quality, size and color may be easily observed, the arrangement being preferably such that the envelops are held in a separate tray or box which is adapted to be arranged in an inclined position above the rear portion of the letter sheets, so that the front edges of the latter are plainly exposed. The envelop tray or box is also preferably adapted to be replaced within the box and when so replaced one of the sides of the tray constitutes a side of the box body.

The entire box is cheaply manufactured and compactly constructed so that it occupies substantially the same space as an ordinary box.

The invention includes other features of improvement which will be hereinafter more fully pointed out.

Figure 4:
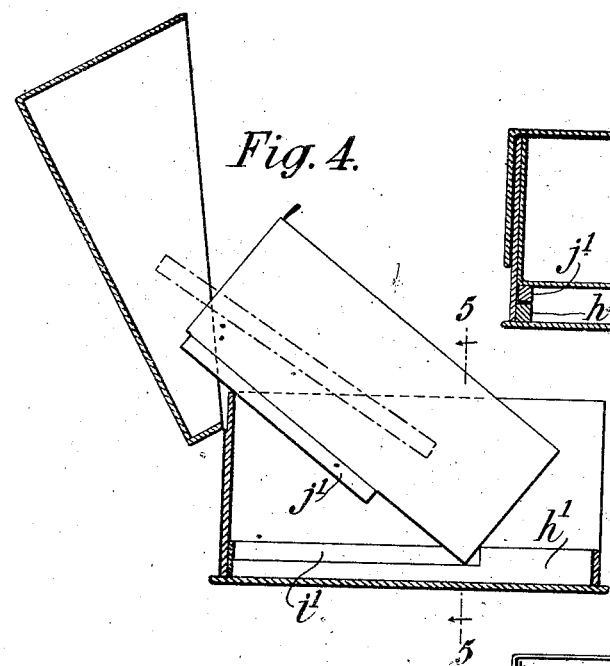
Figure 5:
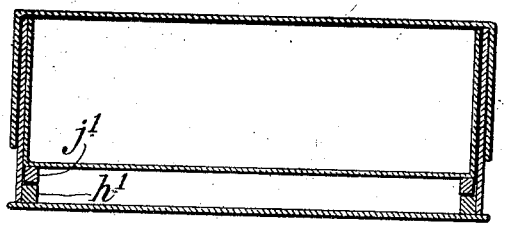
Figure 6:
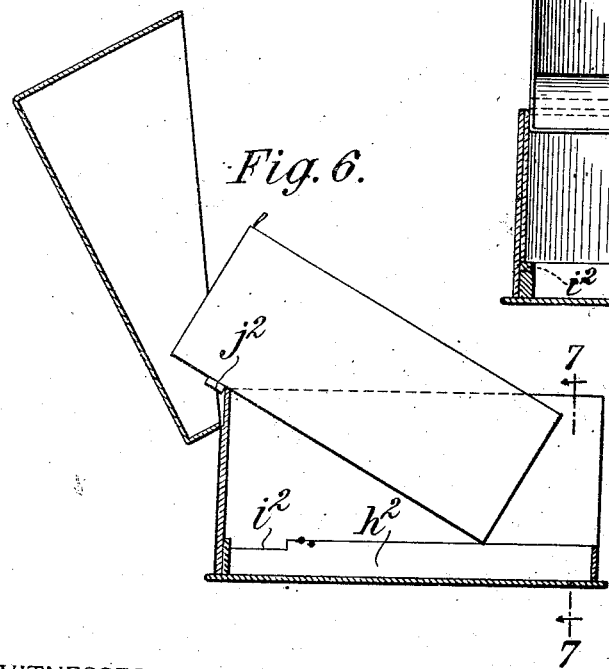
Figure 7:
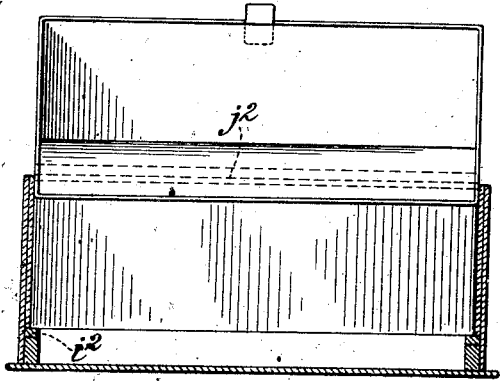
Figure 9:
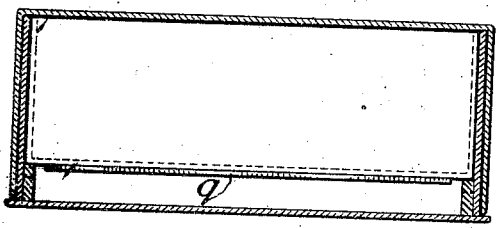
Figure 8:
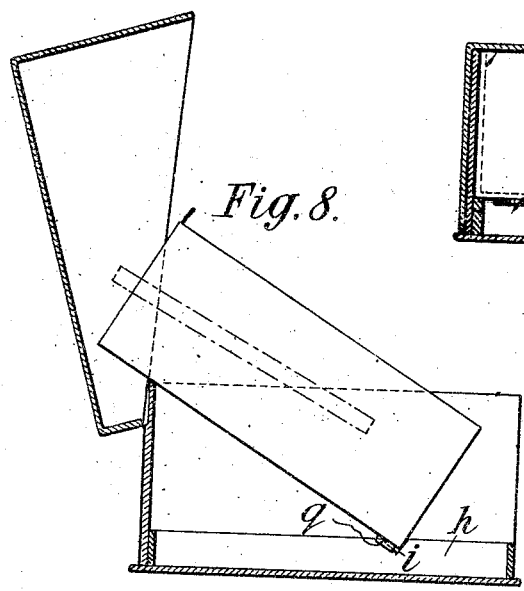
Figure 10:
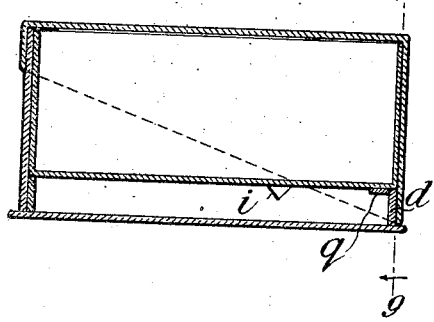
Figure 11:
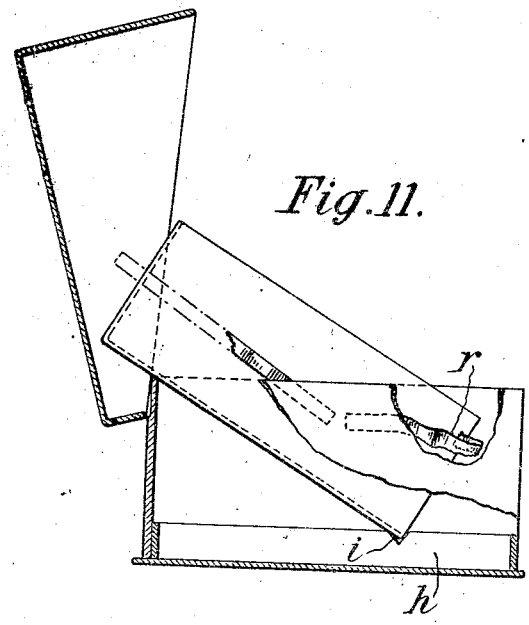
Figure 13:
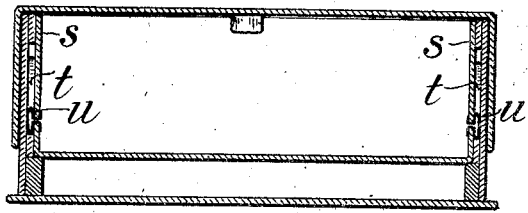
Figure 12:
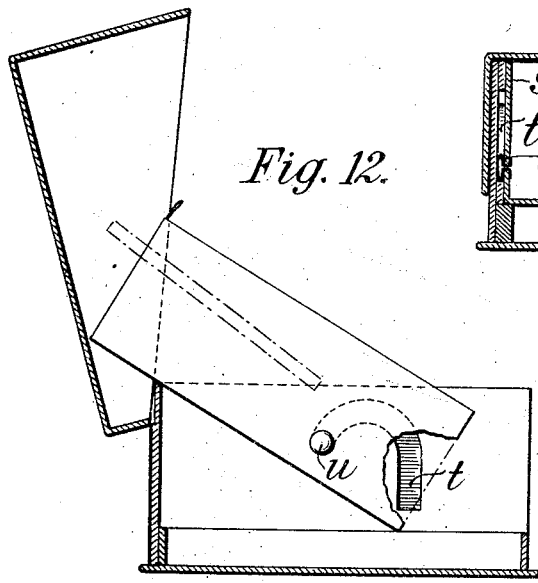
Figure 14:
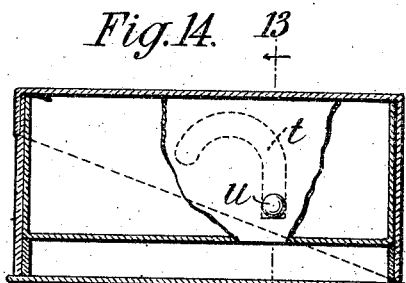
Figure 15:
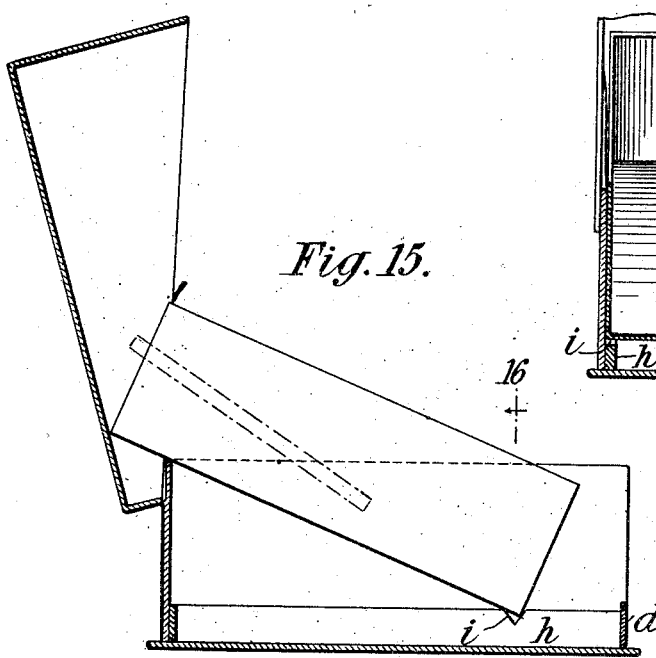
Figure 16:
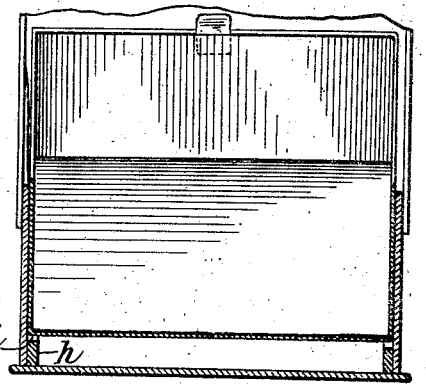

Referring to the drawings which illustrate several embodiments of the invention,—Figure 1 is a perspective view of the preferred form of the invention, showing the box in display position. Fig. 2 is a vertical section taken through one of the ends of the box. Fig. 3 is a similar section showing the box closed. Fig. 4 is a sectional view of a modified form. Fig. 5 is a sectional view taken on the line 5—5 in Fig. 4 and showing the box closed. Fig. 6 is a sectional view of another modification. Fig. 7 is a sectional view of Fig. 6, taken on the line 7—7. Fig. 8 is a sectional view of another modification. Fig. 9 is a longitudinal sectional view on the line 9—9 in Fig. 10 and showing the box closed. Fig. 10 is a cross-sectional view of Fig. 9. Fig. 11 is a cross-sectional view of another modification showing the box open. Fig. 12 is a similar view of another modification. Fig. 13 is a longitudinal section of Fig. 12 on the line 13—13 of Fig. 14. Fig. 14 is a cross-sectional view of Fig. 13. Fig. 15 is a cross-sectional view of another modification showing the box open. Fig. 16 is a longitudinal sectional view of Fig. 15 on the line 16—16.

Referring first to Figs. 1 to 3, let A indicate the box as a whole which is preferably rectangular and of somewhat larger dimensions longitudinally than transversely. The longitudinal and transverse dimensions together with the height of the box depend upon the size and quantity of the paper which is to be carried therein. Preferably the box is constructed with a bottom $a$, sides $b\ b$ and back $c$. The front wall $d$ of the box, however, may be either omitted or greatly reduced in height so that its upper edge approximates in height the stack of paper $e$. As thus constructed, the bottom portion of the box constitutes a receptacle B for the paper. If it is desired to arrange the envelops in the bottom of the box, the front wall $d$ is preferably formed sufficiently high to approximate the top of the stack or stacks of envelops.

In the construction shown, however, the paper is arranged at the bottom of the box and the envelops $f$ are carried in a separate tray or receptacle C which is preferably of such dimensions as to fit nicely within the body of the box, and substantially fill the portion of the latter above the receptacle B.

It is very desirable that when the tray C is wholly within the box its front wall $g$ shall be flush with or form a continuation of the front wall $d$ of the box, so that the box has a neat and attractive appearance when the cover is raised under these conditions. For the purpose of supporting the tray C I prefer to provide a ledge such as $h$ which preferably extends entirely around the interior of the box at the same level as the front wall $d$, so that the front wall $g$ of the tray may be located immediately over the top of the wall $d$.

When the cover D is opened it is desirable to provide some means whereby the tray C shall be prevented from sliding out of the box if the latter should be tilted forwardly, as is apt to occur when the box is being examined by the purchaser. To this end I provide the tray C and box with inter-engaging provisions which are operative when the tray is resting upon the ledge $h$ in the box. In Figs. 1, 2 and 3 such provisions are shown as comprising notches $i$ formed in the ledge $h$ which are designed to receive lugs $j$ formed on the bottom of the tray C. The lugs $j$ may be conveniently formed by making angular incisions in the side walls of the tray C and turning down the lip thus formed to the position shown in Figs. 2 and 3. In this position the wall $g$ of the tray forms a continuation of the front wall $d$ of the box.

An important feature of the invention lies in the provision of means for holding the tray in such position with regard to the body of the box that the stack of paper $e$ is at least partially exposed, so that the prospective customer may observe not only the envelops in the tray but the writing paper beneath, and thus be in more favorable position to judge of the quality and size of the stationery. Preferably means are provided for holding the tray in a tilted position with its rear edge resting against the upper side of the rear wall of the box, while its front bottom edge rests within the box, preferably upon the ledge $h$. In the construction shown the notches $i$ are availed of for this purpose, being so constructed that they are adapted to receive the front bottom edge of the tray as shown in Figs. 1 and 2. By this means the tray is firmly held in its inclined position, and is not liable to be dislodged if the box is lifted or otherwise moved.

The cover D of the box is preferably designed to completely cover the open space left above the narrow front wall $d$ of the box, so that when the cover is down the box is entirely closed. For this purpose the front wall $l$ of the cover is of a height substantially equal to the height of the box, and when the cover is designed to be hinged to the box as shown in Figs. 1 to 3 its side walls $m$ are tapered rearwardly so that its rear wall $n$ is narrow in a vertical direction, and the lower edge of the rear wall is hinged to the box below the top of the latter, as indicated at $o$. Preferably also the cover is provided with a flexible member such as the tape $p$ which is connected to the inner side of one of the walls $b$ to limit the rearward movement of the cover.

In the modification shown in Figs. 4 and 5 the ledge $h'$ is provided with elongated recesses $i'$ while the bottom of the tray is provided with elongated strips $j'$ which are designed to fit within the recesses when the tray is wholly within the box, while the forward ends of the recesses $i'$ are adapted to receive the lower front edge of the tray when the latter is in its inclined position.

In the modification illustrated in Figs. 6 and 7 recesses $i^2$ are provided in the ledge $h^2$ at the rear of the same, and the tray is provided with a strip $j^2$ extending longitudinally of the tray, so that its opposite ends engage the recesses to prevent the forward movement of the tray when the latter is within the box. In this construction instead of the bottom front edge of the tray engaging recesses in the ledge $h$, the tray is held in inclined position by the longitudinal strip $j^2$ engaging the top rear edge of the box, as best seen in Fig. 6.

In the modification illustrated in Figs. 8, 9 and 10 the ledge $h$ is formed with recesses $i$ as in Figs. 1 to 3, designed to engage the lower front edge of the box when the tray is inclined, but when the tray is within the box it is prevented from sliding out the front thereof by a strip $q$ which engages the front wall $d$ of the box, as best seen in Figs. 9 and 10.

In Fig. 11 the construction is the same as in Figs. 8 to 10 with the exception that to prevent the tray from sliding out of the box a flexible member such as the tape $r$ is provided which is connected to the box and tray, and is of such length as to hold the tray in proper position in the box. Its flexibility permits the tray to assume the inclined position shown in Fig. 11.

In Fig. 12 the box is shown as provided with supplemental side pieces $s$ $s$ which are formed with curved grooves $t$ $t$ while the tray is provided with projections in the form of studs or buttons $u$ which fit within the grooves $t$ as shown. By this construction the tray may be moved to the position shown in Fig. 12 where it is held inclined, or to the position shown in Fig. 14 where it is held in its nested position.

In Figs. 15 and 16 the ledge is provided with a notch $i$ designed to receive the lower front corner of the tray, whereby to hold it in its display position, but in this modification the front wall $d$ is continued upwardly to a point slightly higher than the ledge, so that it engages the tray when the latter is in its nested position. This construction is not preferred, since when the tray is wholly within the box its front wall does not constitute a continuation of the front wall $d$.

It will be seen that according to the present invention I have provided a display box which is adapted to expose both the writing paper and envelops to view, and in which the parts when adjusted in their display positions are securely held and not liable to be accidentally displaced from the box. It will be observed that if it is desired to pack the envelops in the lower part of the box the tray will ordinarily be of much shallower construction to accommodate the paper. It will also be observed that while we have illustrated the tray as being adapted to be held in inclined position in order that the merchandise may be displayed in its most attractive form, nevertheless the position assumed by the tray may be materially changed, so long as the lower and upper layers of the merchandise are plainly exposed to view, and preferably so long as the box and its contents are capable of being nested to form an adequately compact inclosure for the articles displayed. It will also be inferred that the invention is useful in other connections than the sale of stationery.

While I have shown and described a number of embodiments of the invention, it will be understood that various changes may be made therein without departing from the spirit of the invention.

What I claim is:—

1. A display box having an opening in its front, a front wall below said opening, a ledge substantially the height of said front wall, a space below said ledge constituting a lower compartment, a cover, a tray, separate from said cover, of substantially the length and breadth of said box adapted in one position to rest upon said ledge, above said lower compartment, and said tray being movable to an inclined position with its front edge at the rear of said front wall of the box whereby to simultaneously expose to view the contents of said lower compartment and its own contents, so that the contents of both said tray and lower compartment may be seen together and at one time.

2. A display box having an opening in its front, a front wall below said opening, a ledge substantially the height of said front wall, a space below said ledge constituting a lower compartment, a cover, a tray, separate from said cover, of substantially the length and breadth of said box adapted in one position to rest upon said ledge above said lower compartment, said tray being movable to an inclined position with its front edge at the rear of said front wall of the box, whereby to simultaneously expose to view the contents of said lower compartment and its own contents, said cover having a depending portion adapted to fit over said opening in the front of said box for preventing said tray from slipping through said front opening when the tray rests flat upon said ledge and the box is closed by said cover.

3. A display box having an opening in its front, a front wall below said opening, a ledge within said box, a space below said ledge constituting a lower compartment, a cover, and a tray, separate from said cover, of substantially the length and breadth of said box adapted to rest upon said ledge above said lower compartment, said ledge having recesses adapted to receive the lower front edge of said tray whereby to support said tray in an inclined position in said box to simultaneously expose to view the contents of said lower compartment and its own contents, so that the contents of both said tray and lower compartment may be seen together and at one time.

4. A display box having an opening in its front, a front wall below said opening, a ledge within said box, a space below said ledge constituting a lower compartment, a cover, and a tray, separate from said cover, of substantially the length and breadth of said box adapted to rest upon said ledge above said lower compartment, said ledge having recesses adapted to receive the lower front edge of said tray, and said tray having lugs at its bottom adapted to engage said recesses when the tray is resting flat upon said ledge, a corner of said tray being adapted, when the tray is inclined, to fit in said recesses, whereby to support said tray in an inclined position in said box to simultaneously expose to view the contents of said lower compartment and its own contents, so that the contents of both said tray and lower compartment may be seen together and at one time.

5. A display box having a cover, a tray, separate from said cover, of substantially the length and breadth of said box and adapted to fit in the upper part thereof, said box having an open side, and a space below said tray constituting a lower compartment, said tray being movable to a position to simultaneously display the contents of said lower compartment through said open side and its own contents, so that the contents of both said tray and lower compartment may be seen together and at one time, said cover having a depending portion adapted to cover the opening in the front of said box, and constituting a means for preventing the tray from passing out through said opening when the cover is closed.

In witness whereof, I have hereunto signed my name in the presence of two subscribing witnesses.

WILLIAM A. PIKE.

Witnesses:
 HAROLD G. ROEHM,
 WILLIAM F. MCELROY.